US010204259B2

United States Patent
Li

(10) Patent No.: US 10,204,259 B2
(45) Date of Patent: Feb. 12, 2019

(54) FINGERPRINT IDENTIFICATION MODULE AND MANUFACTURING METHOD THEREOF, AND DISPLAY DEVICE

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/526,132

(22) PCT Filed: Sep. 23, 2016

(86) PCT No.: PCT/CN2016/099887
§ 371 (c)(1),
(2) Date: May 11, 2017

(87) PCT Pub. No.: WO2017/071441
PCT Pub. Date: May 4, 2017

(65) Prior Publication Data
US 2017/0316251 A1 Nov. 2, 2017

(30) Foreign Application Priority Data
Oct. 30, 2015 (CN) .......................... 2015 1 0729204

(51) Int. Cl.
G06K 9/28 (2006.01)
G06K 9/00 (2006.01)
(Continued)

(52) U.S. Cl.
CPC ....... *G06K 9/00087* (2013.01); *G02F 1/1335* (2013.01); *G02F 1/1343* (2013.01);
(Continued)

(58) Field of Classification Search
CPC ...... G06K 9/00013–2009/0006; G06K 9/0002
See application file for complete search history.

(56) References Cited

U.S. PATENT DOCUMENTS

| 2015/0055057 A1* | 2/2015 | Huang | G02F 1/13338 349/62 |
| 2016/0147113 A1* | 5/2016 | Chang | G02F 1/133528 349/12 |
| 2018/0012057 A1* | 1/2018 | Cho | G06F 3/041 |

FOREIGN PATENT DOCUMENTS

| CN | 202126672 U | 1/2012 |
| CN | 103576372 A | 2/2014 |

(Continued)

OTHER PUBLICATIONS

International Search Report dated Dec. 26, 2016.
Chinese Office Action dated Nov. 30, 2017.

*Primary Examiner* — Brian Werner
(74) *Attorney, Agent, or Firm* — Dilworth & Barrese, LLP; Michael J. Musella, Esq.

(57) ABSTRACT

A fingerprint identification module and a manufacturing method thereof, and a display device are provided. The fingerprint identification module includes: a first electrode layer and a second electrode layer opposed to each other, and a transparent insulating layer interposed between the first electrode layer and the second electrode layer; the first electrode layer includes a plurality of first electrode wires spaced apart from each other; the second electrode layer includes a plurality of second electrode wires spaced apart from each other; the plurality of second electrode wires and the plurality of first electrode wires are intersected with each other; the first electrode layer is formed of a transparent conductive material, and the second electrode layer is a wire grid polarizer.

19 Claims, 4 Drawing Sheets

(51) Int. Cl.
*G02F 1/1335* (2006.01)
*G02F 1/1343* (2006.01)
*G02F 1/1333* (2006.01)
*G06F 3/041* (2006.01)

(52) U.S. Cl.
CPC ...... *G02F 1/13338* (2013.01); *G02F 1/13439* (2013.01); *G02F 1/134336* (2013.01); *G06F 3/0412* (2013.01); *G06K 9/00* (2013.01); *G06K 9/0002* (2013.01); *G02F 1/133528* (2013.01); *G02F 2001/133548* (2013.01)

(56) References Cited

FOREIGN PATENT DOCUMENTS

| | | |
|---|---|---|
| CN | 105389552 A | 3/2016 |
| WO | 2015057467 A1 | 4/2015 |

* cited by examiner

FINGERPRINT IDENTIFICATION MODULE AND MANUFACTURING METHOD THEREOF, AND DISPLAY DEVICE

TECHNICAL FIELD

Embodiments of the present disclosure relate to a fingerprint identification module and a manufacturing method thereof, and a display device.

BACKGROUND

Fingerprint is a line pattern, which is formed by protrusions (i.e., peaks) and grooves (i.e., valleys) in a line-shaped arrangement, of the epidermal layer of a finger. Because fingerprints have the characteristics of life long invariability, uniqueness and convenience, fingerprint has become a synonym of biometric identification and has applied in identity authentication and identification field such as security facilities, time attendance systems, and the like.

Fingerprint identification mainly adopts the capacitance-type sensing technology, a module for identification includes two layers opposed to each other, each layer comprises a plurality of electrode wires spaced apart from each other, the electrode wires of the upper layer and the lower layer are intersected with each other, and an induction capacitor is formed at each intersection; each induction capacitor is equivalent to a detection pixel, in the case of fingerprint detection, the induction capacitance between the electrode wires of the upper layer and the lower layer is changed due to the introduction of the electric field of a human body, because the peaks of the skin of the finger are relatively protruded out, and the valleys of the skin of the finger are relatively caved inward, the influence of the peaks and valleys to the induction capacitance are also different, the fingerprint information of the person who touches the module can be obtained through converting the variation of the induction capacitance into two dimensional image data, such that fingerprint comparison work can be conducted.

After the fingerprint identification module being integrated into the liquid crystal display device, so as to make the liquid crystal display device has full screen fingerprint identification function, the fingerprint identification module has a lot of structural layers, and the liquid crystal display device also has a lot of structural layers to realize display function, therefore, the liquid crystal display device with full screen fingerprint identification function has a lot of structure components, and a thickness of the liquid crystal display device is big.

SUMMARY

Embodiments of the disclosure provide a fingerprint identification module and a manufacturing method thereof, and a display device. An electrode layer of the fingerprint identification module can function as a polarizer of a liquid crystal display device; after the fingerprint identification module is integrated in the liquid crystal display device, so as to allow the liquid crystal display device to have a full screen fingerprint identification function, a polarizer of the liquid crystal display device can be eliminated, and therefore the overall thickness of the liquid crystal display device can be reduced.

At least one embodiment of the disclosure provides a fingerprint identification module, which comprises: a first electrode layer and a second electrode layer opposed to each other, and a transparent insulating layer interposed between the first electrode layer and the second electrode layer; the first electrode layer comprises a plurality of first electrode wires spaced apart from each other; the second electrode layer comprises a plurality of second electrode wires spaced apart from each other; the plurality of second electrode wires and the plurality of first electrode wires are intersected with each other; the first electrode layer is formed of a transparent conductive material, and the second electrode layer is a wire grid polarizer.

For example, in the fingerprint identification module provided by an embodiment of the disclosure, a period of a wire grid of the second electrode layer is in a range from 70 nm to 200 nm; and a wire width of the wire grid is in a range from 50 nm to 150 nm.

For example, in the fingerprint identification module provided by an embodiment of the disclosure, the second electrode wires comprise second sensing electrode wires and second non-sensing electrode wires provided between the second sensing electrode wires; the second sensing electrode wires are connected to sensing signal wires provided with sensing electrical signals; a same number of the second non-sensing electrode wires is provided between any two adjacent second sensing electrode wires, and the same number is in a range from 50 to 300.

For example, in the fingerprint identification module provided by an embodiment of the disclosure, the wire width is ⅓ to ⅔ of the period of the wire grid.

For example, in the fingerprint identification module provided by an embodiment of the disclosure, the wire width is ½ of the period of the wire grid.

For example, in the fingerprint identification module provided by an embodiment of the disclosure, a thickness of the second electrode layer is in a range from 100 nm to 400 nm.

For example, in the fingerprint identification module provided by an embodiment of the disclosure, a material of the second electrode wires is a conductive metal.

For example, in the fingerprint identification module provided by an embodiment of the disclosure, the second electrode wires are intersected with the first electrode wires vertically.

For example, in the fingerprint identification module provided by an embodiment of the disclosure, the first electrode layer is disposed at a side of the fingerprint identification module closer to a fingerprint of a user.

For example, in the fingerprint identification module provided by an embodiment of the disclosure, an interval of two adjacent first electrode wires is in a range from 20 μm to 200 μm.

For example, in the fingerprint identification module provided by an embodiment of the disclosure, a material of the first electrode wires comprises Indium Tin Oxide, Indium Zinc Oxide, or Fluorine-Doped Tin Oxide.

At least one embodiment of the disclosure further provides a manufacturing method for a fingerprint identification module, which comprises: forming a first electrode layer and a second electrode layer opposed to each other, and a transparent insulating layer interposed between the first electrode layer and the second electrode layer; the first electrode layer comprises a plurality of first electrode wires spaced apart from each other; the second electrode layer comprises a plurality of second electrode wires spaced apart from each other; the plurality of second electrode wires and the plurality of first electrode wires are intersected with each other; the first electrode layer is formed of a transparent conductive material, and the second electrode layer is a wire grid polarizer.

For example, in the manufacturing method provided by an embodiment of the disclosure, forming of the second electrode layer comprises: forming a metal layer on a substrate; forming a plurality of photoresist stripes spaced apart from each other on a surface of the metal layer, portions, which are covered by the photoresist stripes, of the metal layer are corresponding to the second electrode wires to be formed; removing portions, which are not covered by the photoresist stripes, of the metal layer, so as to form the plurality of second electrode wires spaced apart from each other; and removing the photoresist stripes covering the second electrode wires.

At least one embodiments of the disclosure further provide a display device, which comprises a display module and any one of the above fingerprint identification modules; the fingerprint identification module is provided at a light-exiting side of the display module.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

Figure 1:
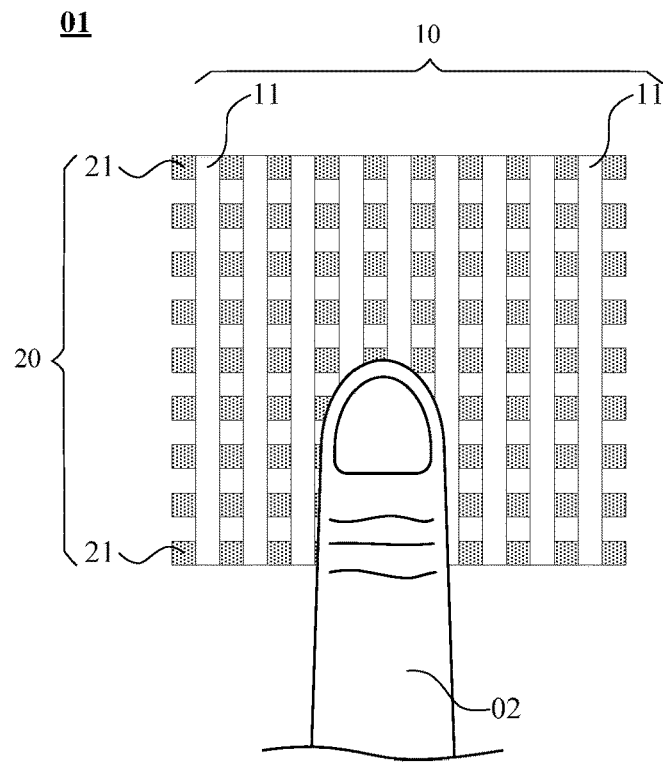
FIG. 1 is a schematically structural top view of a fingerprint identification module provided by an embodiment of the disclosure.

01—fingerprint identification module; 10—first electrode layer; 11—first electrode wire; 20—second electrode layer; 21—second electrode wire; 200—the metal layer; 30—transparent insulating layer; 02—finger; 03—substrate; 04—photoresist stripes; 05—mold; 51—protrusion; 52—groove; 06—display module.

DETAILED DESCRIPTION

The concrete implementation methods of a fingerprint identification module and a manufacturing method thereof, and a display device provided by the embodiments of the disclosure will be described in detail with reference to the drawings.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For the sake of clarity, the size of each structure in the drawing of the embodiment of the disclosure is enlarged but is not intended to represent the real size and scale.

Figure 2:
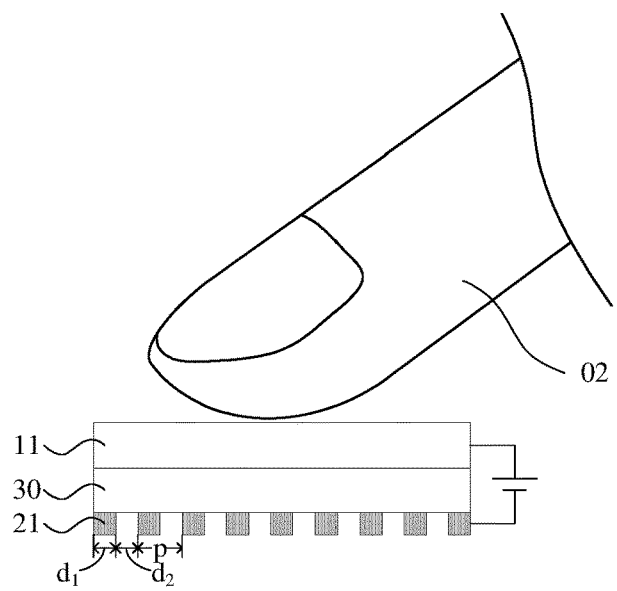
FIG. 2 is a schematically structural side view of a fingerprint identification module provided by an embodiment of the disclosure.

As illustrated in FIG. 1 and FIG. 2, an embodiment of the disclosure provides an fingerprint identification module 01, the fingerprint identification module 01 comprise: a first electrode layer 10 and a second electrode layer 20 opposed to each other, and a transparent insulating layer 30 interposed between the first electrode layer 10 and the second electrode layer 20 (for the sake of clarity, the numerals 10 and 20 are only illustrated in FIG. 1, and the numeral 30 is only illustrated in FIG. 2); the first electrode layer 10 comprises a plurality of first electrode wires 11 spaced apart from each other; the second electrode layer 20 comprises a plurality of second electrode wires 21 spaced apart from each other; the plurality of second electrode wires 21 and the plurality of first electrode wires 11 are intersected with each other; the first electrode layer 10 is formed of a transparent conductive material, and the second electrode layer 20 is a wire grid polarizer.

It should be understood that, firstly, FIG. 1 and FIG. 2 only takes the following structure as an example to illustrate the embodiment of the disclosure, that is, the first electrode layer 10 is provided at an upper part (i.e., closer to the finger 02 to be recognized) of the fingerprint identification module 01, and the second electrode layer 20 is provided at a lower part (i.e., far from the finger 02 to be recognized) of the fingerprint identification module 01. However, this embodiment is not limited to the above example as long as the first electrode layer 10 and the second electrode layer 20 are opposed to each other.

Because the second electrode layer 20 is of a wire grid structure, the wires of the wire grid structure are quite close to each other. As illustrated in FIG. 1 and FIG. 2, the arrangement that the second electrode layer 20 is provided below the first electrode layer 10 can further protects the wire grid structure of the second electrode layer 20 with the transparent insulating layer 30, thereby the issues such as a deformation of the wire grid structure, due to a pressure by a larger force being applied on the wire grid structure, can be avoided. For example, in the fingerprint identification module 01, the first electrode layer 10 is disposed at a side of the fingerprint identification module closer to a fingerprint 02 (i.e., the finger 02) of a person in operation, that is, the second electrode layer 20 is disposed below the first electrode layer 10.

Secondly, the plurality of second electrode wires 21 and the plurality of first electrode wires 11 being intersected with each other indicates that an intersecting portion (i.e., an overlapping portion) is formed by an orthographic projection of the second electrode wires 21 on the plane where the first electrode wires 11 are located with the first electrode wires, an angle of the intersecting (i.e., an angle between the first electrode wires 11 and the second electrode wires 21) is not limited to 90 degree illustrated in FIG. 1 and FIG. 2, the angle of the intersecting can also be any other values beside 90 degree, as long as the first electrode wires 11 and the second electrode wires 21 have an overlapping portion so as to form an induction capacitor.

In the case that the first electrode wires 11 is perpendicular to the second electrode wires 21, the utilization rate of the electrode wires can be maximized, and if the fingerprint identification module 01 is integrated into the entire screen of the display device, the issue of adding other regions other than an effective display region can be avoided. For example, in an embodiment of the disclosure, the second electrode wires 21 can be intersected with the first electrode wires 11 vertically.

Thirdly, the second electrode layer 20 is a wire grid polarizer. The wire grid polarizer comprises a plurality of narrow metal wires (i.e., the second electrode wires 21, the narrow metal wires can be made of elementary metal and/or alloy, and the embodiments will not define the material of the narrow metal wires) spaced apart from each other. Because the narrow metal wires are opaque, in the case that an spacing between adjacent narrow metal wires is sufficiently smaller than a wavelength of incident light, an electric field vector, which is perpendicular to the narrow metal wire (i.e., p-polarized light), can be transmitted through the wire grid polarizer, and an electric field vector, which is parallel to the narrow metal wire (i.e., s-polarized light), can be reflected by the wire grid polarizer, that is, the incident light is converted into a polarized light after transmitted through the wire grid polarizer.

The parameters of the wire grid of the wire grid polarizer can be designed with reference to conventional designs, as long as the incident light can be converted into the polarized light after transmitted through the second electrode layer 20.

The spacing between any two adjacent narrow metal wires of the wire grid polarizer is the same, that is, the second electrode wires 21 are arranged with a same spacing.

For example, a period of the wire grid of the second electrode layer 20 is in a range from 70 nm to 200 nm; and a width of the second electrode wires is in a range from 50 nm to 150 nm. For example, the width of the second electrode wires is ⅓ to ⅔ of the period of the wire grid, the wire width can be ½ of the period of the wire grid in order to improve the polarization effect.

The ratio of the width of the second electrode wires to the period of the wire grid can be adjusted flexibly according to a value of the period of the wire grid and a value of the width of the second electrode wires, a minimum ratio (i.e., ⅓) and a maximum ratio (i.e., ⅔) do not have a one-to-one correspondence relationship with a minimum value (i.e., 70 nm) and a maximum value (i.e., 200 nm) of the period of a wire grid.

For example, as illustrated in FIG. 2, the period of the wire grid (labeled with p in FIG. 2) is refers to a sum of the width of the narrow wires of the wire grid and the spacing of two adjacent narrow metal wires, that is, the sum of the width of the second electrode wires 21 (labeled with d1 in FIG. 2) and the spacing of two adjacent second electrode wires 21 (labeled with d2 in FIG. 2).

Furthermore, in the case that a thickness of the second electrode layer 20 is too small, the transmittance of the second electrode wires 21 is increased significantly, and the light polarization effect of the second electrode layer 20 can be adversely affected; in the case that a thickness of the second electrode layer 20 is too large, a thickness of the above fingerprint identification module 01 becomes too large, which is detrimental to the realization of lighter and thinner display device after the fingerprint identification module 01 is integrated.

Therefore, the thickness of the second electrode layer 20 is in a range from 100 nm to 400 nm.

Fourthly, because the second electrode wires 21 are arranged with the same spacing, the first electrode wires 11 can also be arranged with a same spacing, so as to make the induction capacitors, which are formed by the first electrode wires 11 and the second electrode wires 21 and are configured for fingerprint identification, homogeneously provided in the above fingerprint identification module 01.

Because the second electrode layer 20 is a wire grid polarizer, the period of the wire grid is far smaller than the spacing between the peaks and the valleys of the skin of the finger 02; Furthermore, the first electrode layer 10 is formed of a transparent conductive material such as ITO (i.e., Indium Tin Oxide), IZO (i.e., Indium Zinc Oxide), or FTO (i.e., Fluorine-Doped Tin Oxide), and the first electrode layer 10 cannot be a wire grid polarizer, therefore, the spacing between the first electrode wires 11 can larger than the spacing between the second electrode wires 21, for example, the spacing between the first electrode wires 11 can adopt the spacing between the electrode wires in current fingerprint identification modules, and the spacing between the first electrode wires 11 can be, for example, in a range from 20 μm to 200 μm.

Based on the above content, in the above fingerprint identification module 01 provided by an embodiment of the disclosure, because the first electrode layer 10 of the fingerprint identification module 01 is not the wire grid polarizer, and the second electrode layer 20 of the fingerprint identification module 01 is the wire grid polarizer, in the case that the fingerprint identification module 01 is applied in the display device with full screen fingerprint identification function, the second electrode layer 20 which functions as the wire grid polarizer, can function as a polarizer of the display device as well, and the fingerprint identification on the polarizer can be realized, and therefore the number of the polarizers can be reduced, and the overall thickness of the display device can be accordingly reduced.

Furthermore, because the period of a wire grid of the wire grid polarizer is far smaller than the spacing between the peaks and the valleys of the skin of the finger 02, in the case that each second electrode wire 21 of the second electrode layer 20 is inputted with a sensing signal for the fingerprint identification, the induction capacitors located between the peaks and the valleys cannot conduct effective sensing (i.e., cannot output useful sensing data), and part of the electrical signals are wasted. In an embodiment of the disclosure, furthermore, the second electrode wires 21 comprise second sensing electrode wires connected to sensing signal wires provided with a sensing electrical signal, and comprise second non-sensing electrode wires provided between the second sensing electrode wires; a same number of the second non-sensing electrode wires is provided between any two adjacent second sensing electrode wires, and the same number is in a range from 50 to 300. For example, the same number can be 50, 100, 150, 200 and 300.

That is, at every interval of 50-300 wires, second sensing electrode wires are inputted with the sensing electrical signals, therefore, the waste of the electrical signals can be reduced and the sensing efficiency can be increased in the case that the accuracy of fingerprint identification is maintained.

Based on the above content, an embodiment of the disclosure further provides a manufacturing method for a fingerprint identification module, and the manufacturing method comprises: forming a first electrode layer 10 and a second electrode layer 20 opposed to each other, and a transparent insulating layer 30 interposed between the first electrode layer 10 and the second electrode layer 20; the first electrode layer 10 comprises a plurality of first electrode wires 11 spaced apart from each other; the second electrode layer 20 comprises a plurality of second electrode wires 21 spaced apart from each other; the plurality of second electrode wires 21 and the plurality of first electrode wires 11 are intersected with each other; the first electrode layer 10 is formed of a transparent conductive material, and the second electrode layer 20 is a wire grid polarizer.

Figure 3:
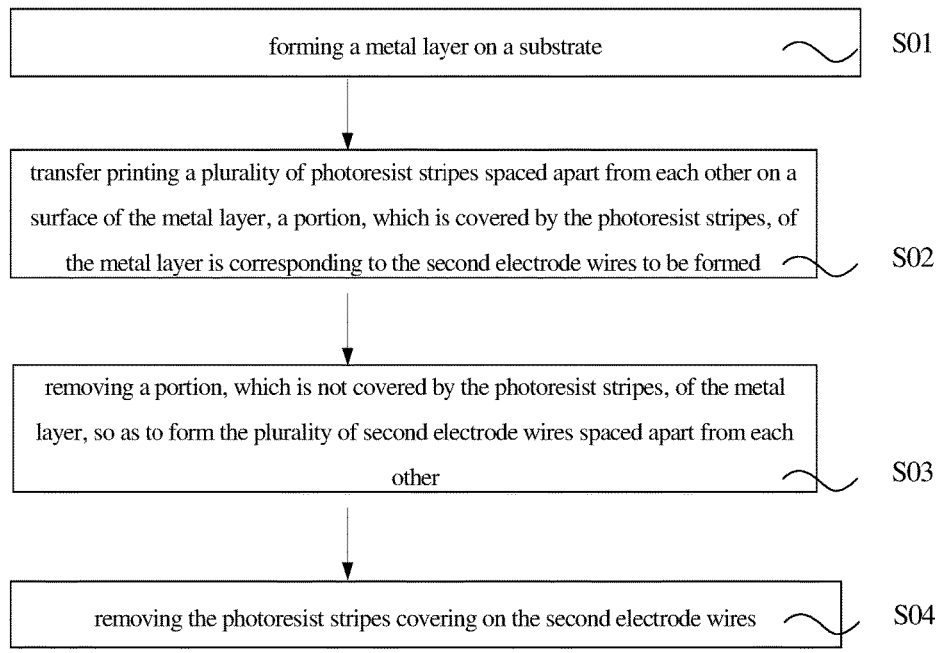
FIG. 3 is a schematically flow chart of manufacturing a second electrode layer of a fingerprint identification module provided by an embodiment of the disclosure.
Figure 4:
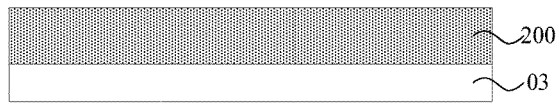
FIG. 4 is a schematically structural view of a product formed by Step S01 in FIG. 3.

Furthermore, as illustrated in FIG. 3, the steps to form the second electrode layer 20 comprise:

Step S01: as illustrated in FIG. 4, forming a metal layer 200 on a substrate 03.

Herein, in the case that the second electrode layer 20 to be formed is located above the first electrode layer 10, the substrate 03 is the transparent insulating layer covering the first electrode layer; in the case that the second electrode layer 20 to be formed is located below the first electrode layer 10, because the fingerprint identification module 01 is configured to be integrated in the display device so as to realize the full screen fingerprint identification, the substrate 03 can be the substrate of the color filter substrate of the display device, for example, a material of the substrate can be a glass or an organic transparent material, but the embodiment will not limit the material of the substrate.

The metal layer 200 can adopt elementary metal and/or alloy, the manufacturing method of the metal layer is not limited to evaporation or sputtering. The material of the metal can adopt the metal aluminum, which has an excellent conductivity and a small resistivity. Considering the light polarization effect of the wire grid polarizer, the thickness of the metal layer 200 is in a range from 100 nm to 400 nm.

Step S02: forming (for example, transfer printing) a plurality of photoresist stripes 04 spaced apart from each other on a surface of the metal layer 200, the portions, which are covered by the photoresist stripes 04, of the metal layer 200 is corresponding to the second electrode wires 21 to be formed.

Herein, because the spacing between the second electrode wires 21 to be formed is extremely small, the spacing between the photoresist stripes 04 is accordingly extremely small, it is challenging to obtain the photoresist stripes 04 spaced apart from each other through conventional exposure and development processes, therefore, the photoresist stripes 04, which are already formed, can be bonded on the surface of the metal layer 200 through a transfer printing method.

Figure 5:
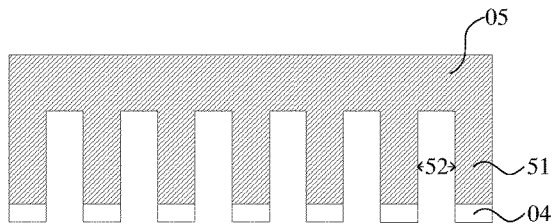
FIG. 5 is a first schematically structural view of the product formed by Step S02 in FIG. 3.

As illustrated in FIG. 5, a layer of photoresist is coated on the mold 05 for imprinting, because the mold 05 comprises a plurality of protrusions 51 and a plurality of grooves 52, a width and a spacing between the protrusions 51 is corresponding to the width and the spacing between the second electrode wires to be formed, the portions, which contact with the protrusions 51, of the photoresist form the plurality of photoresist stripes 04 spaced apart from each other, therefore, the plurality of photoresist stripes 04 spaced apart from each other can be formed through mold transfer printing method.

Figure 6:
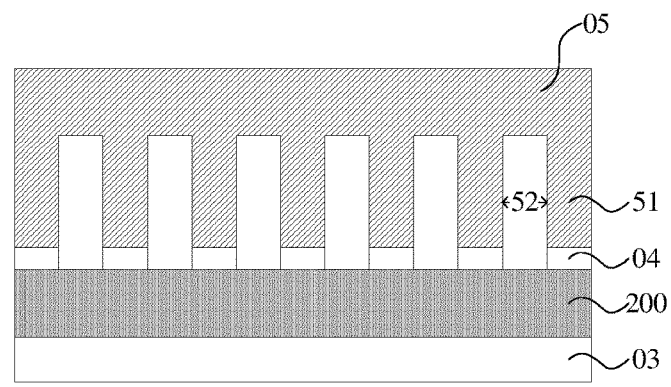
FIG. 6 is a second schematically structural view of the product formed by Step S02 in FIG. 3.

Furthermore, as illustrated in FIG. 6, the imprinting is conducted by allowing a surface, which is formed with the above photoresist stripes 04, of the mold 05 to face toward the surface of the metal layer 200, and therefore, the above photoresist stripes 04 is pressed onto the surface of the metal layer 200.

Figure 7:
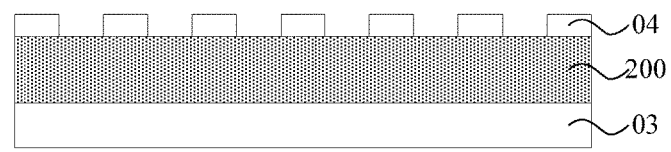
FIG. 7 is a third schematically structural view of the product formed by Step S02 in FIG. 3.

After that, the mold is separated from the photoresist stripes 04, obtaining the metal layer 200 formed with the photoresist stripes 04 as illustrated in FIG. 7.

Obviously, the method to conduct the above Step S02 is not limited to this case, a laser transfer printing method can also be adopted to obtain the above photoresist stripes spaced apart from each other, that is, forming a photoresist layer on the substrate, and the photoresist layer is patterned through exploiting the fine etching characteristics of the laser, and the patterned photoresist layer is transferred and printed onto the surface of the metal layer 200.

Figure 8:
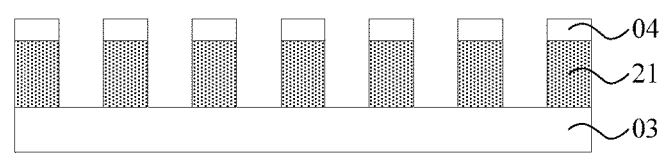
FIG. 8 is a schematically structural view of the product formed by Step S03 in FIG. 3.

Step S03: as illustrated in FIG. 8, removing portions, which are not covered by the photoresist stripes 04, of the metal layer 200, so as to form the plurality of second electrode wires 21 spaced apart from each other.

Herein, the process to remove the metal layer can be a dry etching process with higher etching accuracy, for example, methods such as plasma etching, reactive ion etching, inductively coupled etching can be adopted; for example, etching gas can be gas containing with fluorine or chlorine, such as CF4, CHF3, SF6, CCl2F2, and the like, or a mixture of the above gas with O2.

Figure 9:
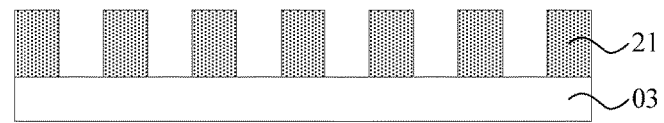
FIG. 9 is a schematically structural view of the product formed by Step S04 in FIG. 3.

Step S04: as illustrated in FIG. 9, removing the photoresist stripes 04 covering the second electrode wires 21.

Herein, the residual photoresist stripes 04 can be removed through an ashing process.

With the above Step S01 to Step S02, the wire grid polarizer with a large area can be easily obtained through nano imprinting process, and the above fingerprint identification module 01 with a large area and the capability to cover the entire screen of the display device can be easily obtained.

Figure 10:
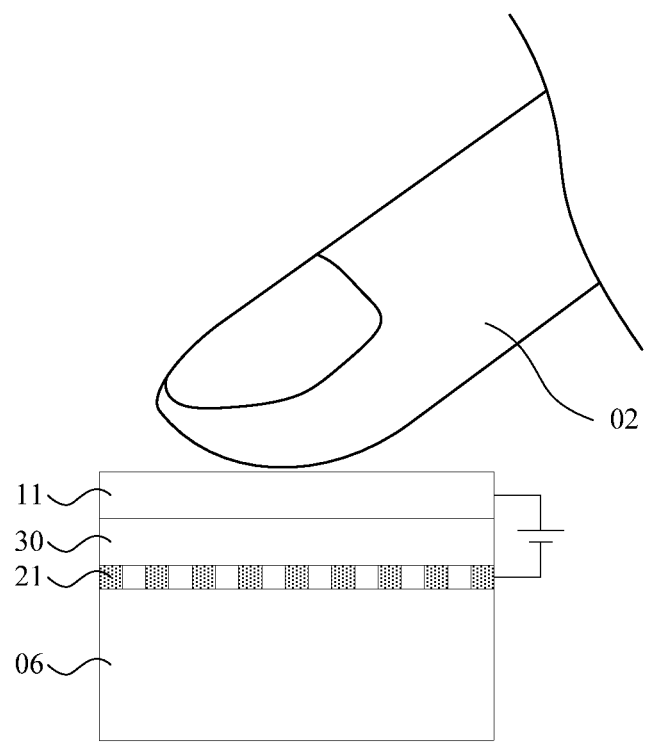
FIG. 10 is a schematically structural side view of a display device provided by an embodiment of the disclosure.

Based on the above contents, an embodiment of the disclosure further provides a display device, as illustrated in FIG. 10, the display device comprises a display module 06 and the above fingerprint identification module 01, the fingerprint identification module 01 is provided at a light-exiting side of the display module 06, that is, the second electrode layer 20 of the fingerprint identification module 01 is a polarizer closer to the light-exiting side of the display module 06.

The above display module can be any products or components that have display function, such as a display panel, a liquid crystal display device, a LCD TV, an electronic paper, a digital photo frame, a cell phone, and a tablet computer.

It should be understood that, the drawings of the disclosure is a simple schematic diagram of the above fingerprint identification module, which is intended to clearly describe the structures related to the inventive concept of the technical solution, other structures unrelated to the inventive concept can refer to conventional structures, and the above other structures are not illustrated in the drawings or are partially illustrated in the drawings.

It is apparent that the presented disclosure can be modified by those skilled in the art without departure from the spirit and scope of the disclosure, if the above modification of the presented disclosure belongs to the scope of the claims of the presented disclosure and its equivalent technologies, the presented disclosure is intended to include the above modifications.

What are described above is related to the illustrative embodiments of the disclosure only and not limitative to the scope of the disclosure; the scopes of the disclosure are defined by the accompanying claims.

The application claims priority to the Chinese patent application No. 201510729204.3, filed Oct. 30, 2015, the entire disclosure of which is incorporated herein by reference as part of the present application.

What is claimed is:

1. A fingerprint identification module, comprising: a first electrode layer and a second electrode layer opposed to each other, and a transparent insulating layer interposed between the first electrode layer and the second electrode layer,
   the first electrode layer comprises a plurality of first electrode wires spaced apart from each other,
   the second electrode layer comprises a plurality of second electrode wires spaced apart from each other, and
   the plurality of second electrode wires and the plurality of first electrode wires are intersected with each other,
   wherein the first electrode layer is formed of a transparent conductive material, and the second electrode layer is a wire grid polarizer;
   wherein the second electrode wires comprise second sensing electrode wires and second non-sensing electrode wires provided between the second sensing electrode wires;
   the second sensing electrode wires are connected to sensing signal wires provided with sensing electrical signals; and
   a same number of the second non-sensing electrode wires is provided between any two adjacent second sensing electrode wires.

2. The fingerprint identification module according to claim 1, wherein a period of a wire grid of the second electrode layer is in a range from 70 nm to 200 nm; and a wire width of the wire grid is in a range from 50 nm to 150 nm.

3. The fingerprint identification module according to claim 1,
   wherein the same number is in a range from 50 to 300.

4. The fingerprint identification module according to claim 2, wherein the wire width is ⅓ to ⅔ of the period of the wire grid.

5. The fingerprint identification module according to claim 4, wherein the wire width is ½ of the period of the wire grid.

6. The fingerprint identification module according to claim 1, wherein a thickness of the second electrode layer is in a range from 100 nm to 400 nm.

7. The fingerprint identification module according to claim 1, wherein a material of the second electrode wires is a conductive metal.

8. The fingerprint identification module according to claim 1, wherein the second electrode wires are intersected with the first electrode wires vertically.

9. The fingerprint identification module according to claim 1, wherein the first electrode layer is disposed at a side of the fingerprint identification module closer to a fingerprint of a user.

10. The fingerprint identification module according to claim 1, wherein an interval of two adjacent first electrode wires is in a range from 20 μm to 200 μm.

11. The fingerprint identification module according to claim 1, wherein a material of the first electrode wires comprises Indium Tin Oxide, Indium Zinc Oxide, or Fluorine-Doped Tin Oxide.

12. A manufacturing method for a fingerprint identification module, comprising: forming a first electrode layer and a second electrode layer opposed to each other, and a transparent insulating layer interposed between the first electrode layer and the second electrode layer,
    wherein the first electrode layer comprises a plurality of first electrode wires spaced apart from each other;
    the second electrode layer comprises a plurality of second electrode wires spaced apart from each other;
    the plurality of second electrode wires and the plurality of first electrode wires are intersected with each other;
    the first electrode layer is formed of a transparent conductive material, and the second electrode layer is a wire grid polarizer;
    wherein the second electrode wires comprise second sensing electrode wires and second non-sensing electrode wires provided between the second sensing electrode wires;
    the second sensing electrode wires are connected to sensing signal wires provided with sensing electrical signals;
    a same number of the second non-sensing electrode wires is provided between any two adjacent second sensing electrode wires.

13. The manufacturing method according to claim 12, wherein forming of the second electrode layer comprise:
    forming a metal layer on a substrate;
    forming a plurality of photoresist stripes spaced apart from each other on a surface of the metal layer, portions, which are covered by the photoresist stripes, of the metal layer are corresponding to the second electrode wires to be formed;
    removing portions, which are not covered by the photoresist stripes, of the metal layer, so as to form the plurality of second electrode wires spaced apart from each other; and
    removing the photoresist stripes covering on the second electrode wires.

14. A display device, comprising:
    a display module and the fingerprint identification module according to claim 1;
    wherein the fingerprint identification module is provided at a light-exiting side of the display module.

15. The fingerprint identification module according to claim 3, wherein a thickness of the second electrode layer is in a range from 100 nm to 400 nm.

16. The fingerprint identification module according to claim 3, wherein a material of the second electrode wires is a conductive metal.

17. The fingerprint identification module according to claim 3, wherein the first electrode layer is disposed at a side of the fingerprint identification module closer to a fingerprint of a user.

18. The fingerprint identification module according to claim 3, wherein an interval of two adjacent first electrode wires is in a range from 20 μm to 200 μm.

19. The fingerprint identification module according to claim 3, wherein a material of the first electrode wires comprises Indium Tin Oxide, Indium Zinc Oxide, or Fluorine-Doped Tin Oxide.

* * * * *